United States Patent [19]

Sakaguchi et al.

[11] Patent Number: 4,782,860
[45] Date of Patent: Nov. 8, 1988

[54] MAGNETIC FLOW CONTROL VALVE

[75] Inventors: Yuji Sakaguchi; Takeo Takagi; Yoshinori Imamura, all of Kodaira, Japan

[73] Assignee: Bridgestion Corporation, Tokyo, Japan

[21] Appl. No.: 99,969

[22] Filed: Sep. 23, 1987

Related U.S. Application Data

[63] Continuation of Ser. No. 024,217, Mar. 10, 1987, Pat. No. 4,771,983, which is a continuation-in-part of Ser. No. 875,511, Jun. 23, 1986, abandoned, which is a continuation of Ser. No. 743,732, Jun. 23, 1985, abandoned.

[30] Foreign Application Priority Data

Jun. 15, 1984 [JP] Japan .................. 59-122108

[51] Int. Cl.$^4$ .............. F16K 31/06; F15B 13/044
[52] U.S. Cl. .............. 137/596.17; 251/129.14; 251/129.16; 251/129.08; 251/129.21; 335/271
[58] Field of Search ............ 137/596.17; 251/129.14, 251/129.08, 129.21, 129.16, 368; 335/90, 247, 257, 271

[56] References Cited

U.S. PATENT DOCUMENTS

| | | | |
|---|---|---|---|
| 3,463,192 | 8/1969 | Herion, Jr. ................. | 251/368 |
| 3,501,724 | 3/1970 | Westphal .................. | 335/257 |
| 3,521,854 | 7/1970 | Leiber et al. ............. | 251/129.14 X |
| 3,659,631 | 5/1972 | Rakoske .................... | 137/596.17 |
| 3,837,356 | 9/1974 | Selep et al. ............... | 251/368 X |
| 3,874,407 | 4/1975 | Griswold .................. | 137/596.17 |
| 4,272,748 | 6/1981 | Fugate et al. ............. | 335/271 |
| 4,490,057 | 12/1984 | Reece ..................... | 335/257 X |
| 4,580,598 | 4/1986 | Itoh ........................ | 251/129.14 X |

Primary Examiner—Arnold Rosenthal
Attorney, Agent, or Firm—Sughrue, Mion, Zinn, Macpeak, and Seas

[57] ABSTRACT

A magnet for control valve includes a housing having an inlet and an outlet for a pressurized fluid, a valve seat member having a conical inner surface valve seat, a spherical valve body adapted to be in line contact with the valve seat, a throttle adjusting plate made of a magnetic material shiftable toward and away from the valve seat, and an electromagnet for attracting and releasing the throttle adjusting plate to shift the valve body toward and away from the valve seat. According to the invention a sheet, preferably made of urethane foam is arranged on a side of the throttle adjusting plate opposite to the valve body, thereby eliminating noise caused by self-oscillation of the valve body and throttle adjusting plate, while maintaining high responsibility as a magnetic control valve.

12 Claims, 3 Drawing Sheets

FIG._1
PRIOR ART
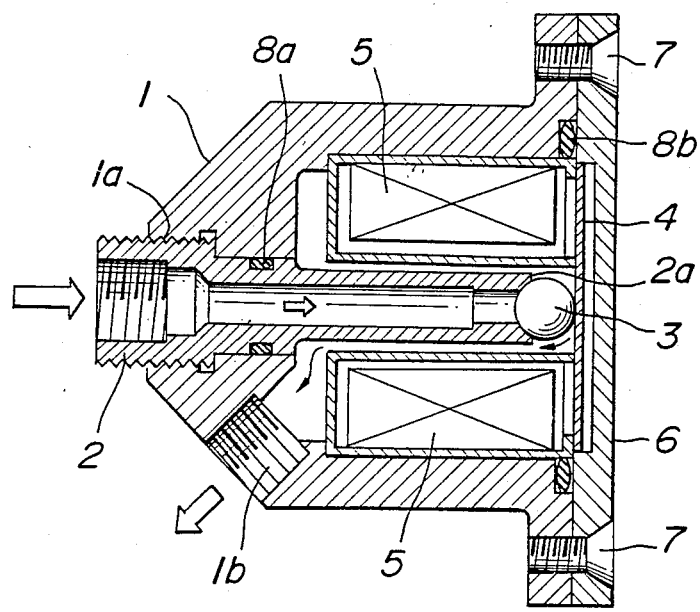
FIG._2
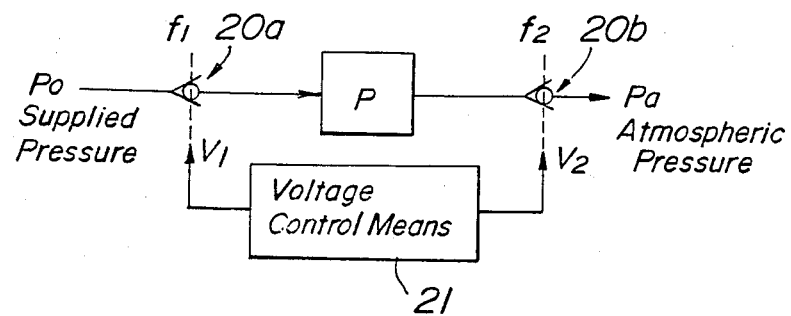

MAGNETIC FLOW CONTROL VALVE

This application is a continuation of U.S. patent application Ser. No. 07/024,217 filed on Mar. 10, 1987 now U.S. Pat. No. 4,771,983, dated Sept. 20, 1988, which is a continuation-in-part of Ser. No. 06/875,511 filed on June 23, 1986, now abandoned, which is a continuation of Ser. No. 06/743,732, filed June 23, 1985, now abandoned.

BACKGROUND OF THE INVENTION

1. Field of the Invention

This invention relates to a flow control valve used in a fluid circuit for intentionally moving or driving fluid equipment, and more particularly to a magnetic flow control valve capable of continuously changing flow rate or pressure of a fluid by controlling force shifting a valve body toward a valve seat when required.

2. Description of the Prior Art

Flow control valves are used to adjust the flow rate in fluid circuits so as to regulate, for example, moving speeds of actuators or rates in pressure increase. The flow control valves are generally required in performance to have capabilities of flow rate adjustment in wide ranges and fine adjustment and stable and continuous characteristics.

A needle valve is commonly used flow control valve. It includes a needle valve member having a conical end adapted to be moved toward and away from a valve seat with the aid of a screw-threaded rod to change open degree of the valve. However, it encounters many problems due to its construction. For example, it is very difficult to eliminate plays or clearances between screw-threads and misalignment of axes of an orifice and the needle valve body. Moreover, a relation between rotated angles of the screw-threaded rod and opening of the orifice is usually not constant, so that accurate adjustment of flow rate and pressure is impossible. Wearing at screw-threads is also a great problem difficult to solve.

On the other hand, there is a flow control valve developed in order to solve the above mechanical problems, which is shown, for example, in FIG. 1. This valve includes a valve housing 1 having an inlet 1a for a pressurized fluid, a valve seat member 2 having a substantially conical inner surface valve seat 2a and fixed into the inlet 1a of the valve housing 1, a valve body 3 adapted to be in line contact with the conical inner surface valve seat 2a, and a throttle adjusting plate 4 shiftable in axial directions of the valve seat member 2 to shift the valve body 3, thereby controlling the flow rate of the pressurized fluid flowing between the valve seat 2a and the valve body 3. In order to shift the throttle adjusting plate 4 made of a magnetic material in aligned axial directions of valve seat member 2, an electromagnet 5 is arranged about the valve seat member 2 in opposition to and spaced apart from the throttle adjusting plate 4. The magnetic force of the electromagnet 5 is changed so as to vary the attractive force acting upon the throttle adjusting plate 4. In other words, by changing electric current or voltage to be applied to a coil of the electromagnet 5 a force for shifting the valve body toward the valve seat (the force is referred to as "throttle force", hereinafter) can be continuously adjusted. In this manner, the valve is easily operated without causing the mechanical problems above described such as the play at screwthreads.

With the magnetic flow control valve above described, however, the throttle adjusting plate tends to go into violent free movement in axial and/or traverse directions of the valve seat member due to self-oscillation of the throttle adjusting plate, so that the plate would collide against the spherical valve body 3 or the valve body would collide against the valve seat. As a result, noise often occurs in pressure waveforms of the pressurized fluid exhausted from an outlet 1b formed in the valve housing 1. This is particularly acute in a servo valve when changing its set pressure, for example, shown in FIG. 2, wherein two magnetic flow control valves 20a and 20b are electrically connected through voltage control means 21 which serves to change the voltages applied to the valves 20a and 20b in a manner one voltage increases and the other decreases so as to adjust throttle forces $f_1$ and $f_2$ to change a set pressure P.

In order to prevent the self-oscillation of the throttle adjusting plate and the spherical valve body due to so to say "dancing movement", a clearance between the throttle adjusting plate 4 and a cover 6 may be as small as possible. However, such a small clearance therebetween simultaneously makes small a movable stroke of the valve body so as to reduce the controlled flow rate, thereby lowering the responsibility as a servo valve. That is particularly acute in case of a valve having a spherical valve body whose diameter is more than 5 mm.

SUMMARY OF THE INVENTION

It is a principal object of the invention to provide an improved magnetic flow control valve which eliminates all the disadvantages of the prior art above described and which prevents the noise caused by the self-oscillation of the movable members of the valve and exhibits high responsibility.

In order to achieve this object, in a magnetic flow control valve including a valve housing consisting of a housing body and a cover closing an opening of said housing body and having an inlet and an outlet for a pressurized fluid, a valve seat member located in said housing and having a valve seat in the form of a substantially conical inner surface, a substantially spherical valve body to be seated on said valve seat in said housing, a throttle adjusting plate made of a magnetic material arranged in the valve housing on opposite side of the valve seat with respect to said valve body and supported in said valve housing so as to be shiftable toward and away from said valve seat, and electromagnet means for shifting said throttle adjusting plate toward and away from said valve seat to control flow rate of said pressurized fluid by changing electric current supplied to the electromagnet, according to the invention said throttle adjusting plate is provided with cushioning means on a side opposite to said valve body.

The cushioning means is preferably made of urethane foam.

The cushioning means may be attached by means of an adhesive to the throttle adjusting plate or a portion of the valve housing, particularly the cover closing the opening of the housing body.

In order that the invention may be more clearly understood, preferred embodiments will be described, by way of example, with reference to the accompanying drawings.

BRIEF DESCRIPTION OF THE DRAWINGS

FIG. 1 is a sectional view of a magnetic flow control valve of the prior art;

FIG. 2 is a schematic view of a servo valve, by way of example, using magnetic flow control valves;

DETAILED DESCRIPTION OF THE PREFERRED EMBODIMENT

Figure 3:
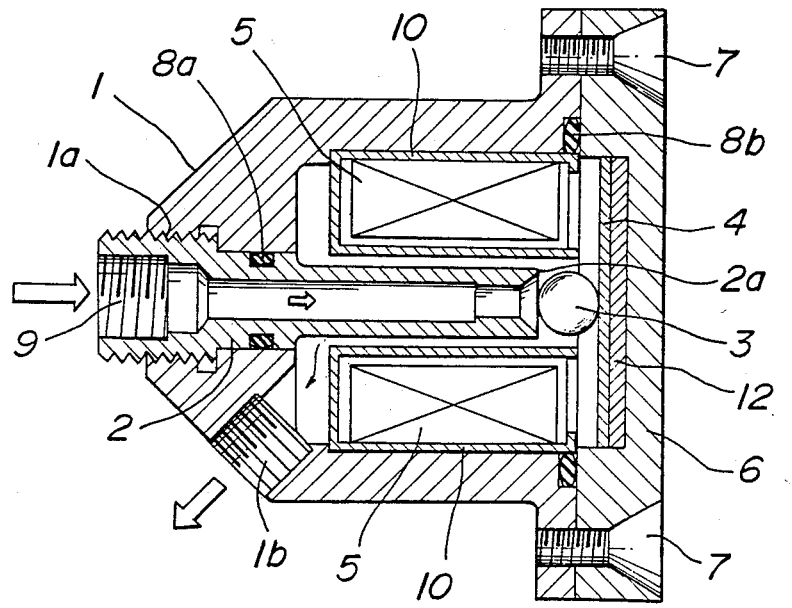
FIG. 3 is a sectional view of a preferred embodiment of the magnetic flow control valve according to the invention.

In the following drawings, like components are designated by the same reference numerals as those in FIG. 1.

FIG. 3 illustrates a preferred embodiment of a flow control valve according to the invention. A valve housing 1 formed with an outlet 1b and an inlet 1a for a pressurized fluid, in which a valve seat member 2 is fixed. An O-ring 8a is provided on the valve seat member 2 to seal it from the inlet 1a. The valve seat member 2 is formed at one end with a fitting 9 for connecting a pipe for supplying the pressurized fluid and at the other end with a valve seat 2a against which a spherical valve body 3 abuts and further formed along its axis with a passage through which the pressurized fluid flows. Although the fitting 9 and the valve seat 2a have been shown formed integrally with the valve seat member 2, they may be provided separately from the valve seat member.

The valve seat 2a is formed by substantially conical inner surface so as to be brought into line contact with the spherical body 3. It is preferable to make the valve seat 2a of a ceramic material of aluminum oxide or silicon carbide in order to improve the wear-resistance of the valve seat in consideration of that the spherical valve body is usually a steel ball. Instead of the steel ball, the valve body may be formed by a plastic material, preferably, acetal resin, which enables the valve body to be light, and substantially completely eliminates noise caused in collision of the valve body against the valve seat and the throttle adjusting plate and improve the durability of the contacting members. Moreover, such a plastic material is high chemical attack-resistant. Accordingly, it is preferable to select the material of the valve body so as to meet a use of the valve.

An electromagnet 5 is fixed to the valve housing 1 so as to be spaced apart from the valve seat member 2. The electromagnet 5 is surrounded by shield plates 10 whose end remote from the fitting 9 is opened through which the magnetic force directly acts on the throttle adjusting plate 4.

A cover 6 is fixed to an open end of the housing 1 by means of clamping bolts 7 through an O-ring 8b located in the open end of the housing in a fluid-tight manner between the housing and the cover. The cover 6 is formed with a recess 11 receiving therein a throttle adjusting plate 4 made of a magnetic material shiftable in axial directions of the valve seat member 2 and in opposition to the valve seat 2a and the electromagnet 5. According to the invention, a sheet 12 of urethane foam as cushioning means is arranged between the throttle adjusting plate 4 and a bottom of the recess 11. The sheet 12 may be attached to the cover 6 or plate 4.

Figure 4:
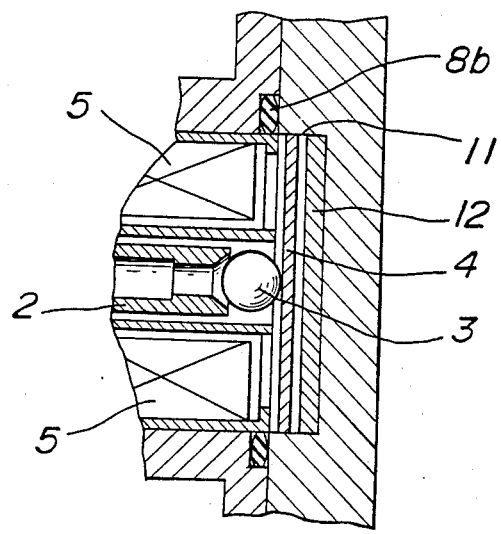
FIG. 4 is a partial sectional view of the valve shown in FIG. 3, illustrating a half closed position of the valve.

FIG. 3 illustrates the magnetic flow control valve under fully opened condition, when the electromagnet has been deenergized to urge the throttle adjusting plate to the right by the pressure of the fluid, where the pressurized fluid freely flows through a clearance between the valve seat 2a and the valve body 3 as shown by arrows. The throttle adjusting plate is urged against the sheet 12 by the action of the fluid. FIG. 4 is a partial sectional view of the magnetic flow control valve, which is under an intermediate condition where the throttle adjusting plate 4 is attracted to an intermediate position away from the sheet 12 to bring the valve body closer to the valve seat leaving a slight clearance therebetween.

The operation of the magnetic flow control valve according to the invention will be explained hereinafter.

When the valve body is in close contact with the valve seat, the attractive force from the electromagnet acts on the throttle adjusting plate, so that any self-oscillation of the valve body and the throttle adjusting plate is restrained. However, when the valve body is moved away from the valve seat to permit the pressurized fluid to flow therethrough, the valve body and the throttle adjusting plate of the prior art magnetic flow control valve undergo self-oscillation under certain conditions. In contract herewith, the magnetic flow control valve according to the invention comprises the sheet made of an elastic material, preferably, a material of low elasticity, such as urethane foam to completely absorb inertia force of the throttle adjusting plate. Moreover, the sheet does not interrupt the movement of the throttle adjusting plate because of its low elasticity.

Figure 5:
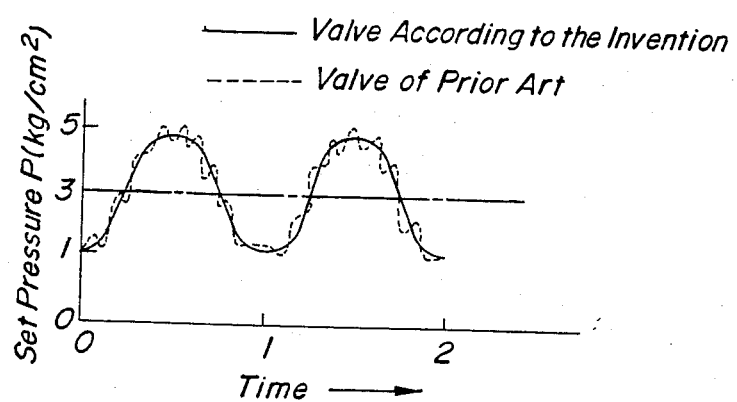
FIG. 5 is a graph illustrating frequency responsibilities of servo valves using the valve according to the invention and the valve of the prior art.

FIG. 5 illustrates a comparison of variation in set pressure between magnetic flow control valves according to the invention and of the prior art as the results of an experiment effected by the inventors. The valves used in this experiment had lengths of approximately 60 mm and heights of about 70 mm and steel balls whose diameters were ¼ inches (about 6.35 mm). Thicknesses of urethane foam sheets were 1 mm. Respective two valves were used to form servo valves as shown in FIG. 2. Throttle forces $f_1$ and $f_2$ were appropriately changed to vary set pressures P. Variations in set pressure P are shown in FIG. 5. The variation in set pressure of the valve according to the invention is shown in a solid line which indicates the smooth responsibility of the valve according to the invention. On the other hand, the variation in set pressure of the prior art valve is shown in a broken line, wherein on a response curve of 1 Hz are superposed vibrations of the order of 10 Hz to interrupt the sufficient function of a servo valve.

As can be seen from the above description, the magnetic flow control valve according to the invention can suppress the noise caused by the superposition of self-oscillation of the valve body and the throttle adjusting plate on pressure waveforms, maintaining the merit of the magnetic flow control valve in that flow rate can be simply adjusted by changing the electric current to be supplied to the electromagnet so as to shift the valve body toward the valve seat with the aid of the throttle adjusting plate to be attracted by the electromagnet. In this manner, the throttle adjusting plate and hence the valve body can be simply and easily shifted by a slight force to obtain a high responsive magnetic flow control valve. This is particularly advantageous in using the magnetic flow control valve as a servo valve.

It is further understood by those skilled in th art that the foregoing description is that of preferred embodiments of the disclosed valves and that various changes and modifications may be made in the invention without departing from the spirit and scope thereof.

What is claimed is:

1. A magnetic flow control valve including a valve housing consisting of a housing body and a cover closing an opening of said housing body and having an inlet and an outlet for pressurized fluid, a valve seat member located in said housing and having a valve seat in the form of a substantially conical inner surface, a substantially spherical valve body to be seated on said valve seat in said housing, a throttle adjusting plate made of a magnetic material arranged in the valve housing on opposite side of the valve seat with respect to said valve body and supported in said valve housing and shiftable toward and away from said valve seat, and electromagnet means for shifting said throttle adjusting plate toward and away from said valve seat to control flow rate of said pressurized fluid by changing electric current supplied to the electromagnet, said throttle adjusting plate further comprising elastic cushioning means on a side opposite to said valve body, for absorbing inertia forces of said throttle adjusting plate as the flow rate of said pressurized fluid is changed.

2. A magnetic flow control valve as set forth in claim 1, wherein said cushioning means is attached by means of an adhesive to a portion of said valve housing shiftably supporting said throttle adjusting plate.

3. A magnetic flow control valve as set forth in claim 1, wherein said cushioning means is attached to the throttle adjusting plate by means of an adhesive.

4. A magnetic flow control valve as set forth in claim 1, wherein said cushioning means is made of urethane foam.

5. A magnetic flow control valve as set forth in claim 1, wherein said cushioning means is of a circular disc substantially similar to a shape of said throttle adjusting plate.

6. A magnetic flow control valve as set forth in claim 1, wherein said valve seat member is an elongated member formed along its axis with a passage through which said pressurized fluid flows and formed at its outer end with said inlet and at the other inner end with said valve seat.

7. A magnetic flow control valve as set forth in claim 6, wherein said electromagnet is arranged about and spaced apart from said valve seat member.

8. A magnetic flow control valve as set forth in claim 1, wherein said cover is formed in its inside with a recess for supporting said throttle adjusting plate and said cushioning means.

9. A pneumatic actuator control system comprising; a first magnetic flow control valve having an outlet connectable to an inlet of pneumatic actuator supplied with compressed air, an inlet connectable to a compressed air supply source, a second magnetic flow control valve having an inlet connectable to an outlet of said pneumatic actuator and an outlet to be opened on a lower pressure side, voltage control means for changing voltages to be applied to said first and second magnetic flow control valves in the manner one voltage increases and the other decreases, each said magnetic flow control valves including a valve housing consisting of a housing body and a cover closing a opening of said housing body and having said inlet and outlet, a valve seat member located in said inlet and outlet, a valve seat member located in said housing and having a valve seat in the form of a substantially conical inner surface, a substantially spherical valve body to be seated on said valve seat in said housing, a throttle adjusting plate made of a magnetic material arranged in the valve housing on opposite side of the valve seat with respect to said valve body and supported in said valve housing so as to be shiftable toward and away from said valve seat, and electromagnet means for shifting said throttle adjusting plate toward and away from said valve seat to control flow rate of the compressed air by changing electric voltage supplied to the electromagnet means, said throttle adjusting plate provided with elastic cushioning means on a side opposite to said valve body for absorbing inertia forces of said throttle adjusting plate as the flow rate of said pressurized fluid is changed.

10. A magnetic flow control valve as set forth in claim 9, wherein said valve seat is made of a ceramic material.

11. A magnetic flow control valve as set forth in claim 10, wherein said ceramic material is selected from the group consisting of aluminum oxide and silicon carbide.

12. A magnetic flow control valve as set forth in claim 9, wherein said valve body is formed by a plastic material.

* * * * *